(12) United States Patent
Yamanashi

(10) Patent No.: US 6,886,799 B2
(45) Date of Patent: May 3, 2005

(54) STRUCTURE FOR MOUNTING HEAVY ARTICLE TO CARRIER BODY

(75) Inventor: Satoru Yamanashi, Kariya (JP)

(73) Assignee: Denso Corporation, Kariya (JP)

( * ) Notice: Subject to any disclaimer, the term of this patent is extended or adjusted under 35 U.S.C. 154(b) by 37 days.

(21) Appl. No.: 10/368,202

(22) Filed: Feb. 18, 2003

(65) Prior Publication Data

US 2003/0160141 A1 Aug. 28, 2003

(30) Foreign Application Priority Data

Feb. 27, 2002 (JP) ....................................... 2002-051331

(51) Int. Cl.[7] ............................................. F16M 13/00
(52) U.S. Cl. ........................ 248/610; 248/613; 248/674; 248/675; 248/300; 403/408.1; 403/13; 267/160; 267/30
(58) Field of Search ................... 267/160, 30; 411/174, 411/175, 107, 173, 177; 403/408.1, 13, 14; 248/610, 300, 613, 674, 675, 71, 73

(56) References Cited

U.S. PATENT DOCUMENTS

| | | | | |
|---|---|---|---|---|
| 2,560,098 A | * | 7/1951 | Fernstri ....................... | 248/544 |
| 2,914,713 A | * | 11/1959 | Rice ............................ | 335/274 |
| 4,289,043 A | * | 9/1981 | Chabre et al. ................ | 74/609 |
| 4,865,289 A | * | 9/1989 | Lawson ....................... | 248/666 |
| 4,920,696 A | * | 5/1990 | Mawby et al. .............. | 312/404 |
| 5,407,310 A | * | 4/1995 | Kassouni .................... | 411/107 |
| 5,417,401 A | * | 5/1995 | Thompson et al. ......... | 248/674 |

FOREIGN PATENT DOCUMENTS

JP 53-36521 3/1978

* cited by examiner

*Primary Examiner*—Kimberly Wood
(74) *Attorney, Agent, or Firm*—Harness, Dickey & Pierce, PLC

(57) ABSTRACT

A structure for mounting a heavy article 27 to a carrier body 31 via an intermediate member 20, capable of temporarily fixing the heavy article during the mounting operation, wherein the intermediate member 20 is provided in a lower part thereof with a lower attachment portion 21 having holes 26 for fixing the heavy article 27 and in an upper part thereof with upper attachment portions 23 having engagement portions 25 for being temporarily fixed to the carrier body 31 and fixation portions 24 for being firmly fixed to the carrier body 31. To fix the intermediate member 20 to the heavy article 27, the lower attachment portion 21 of the former is sandwiched between a pair of elastic members 28 made of soft material, and fastened to the heavy article 27 by fastening members 30 through the holes 26, for allowing a slight vibration of the heavy article 27.

6 Claims, 6 Drawing Sheets

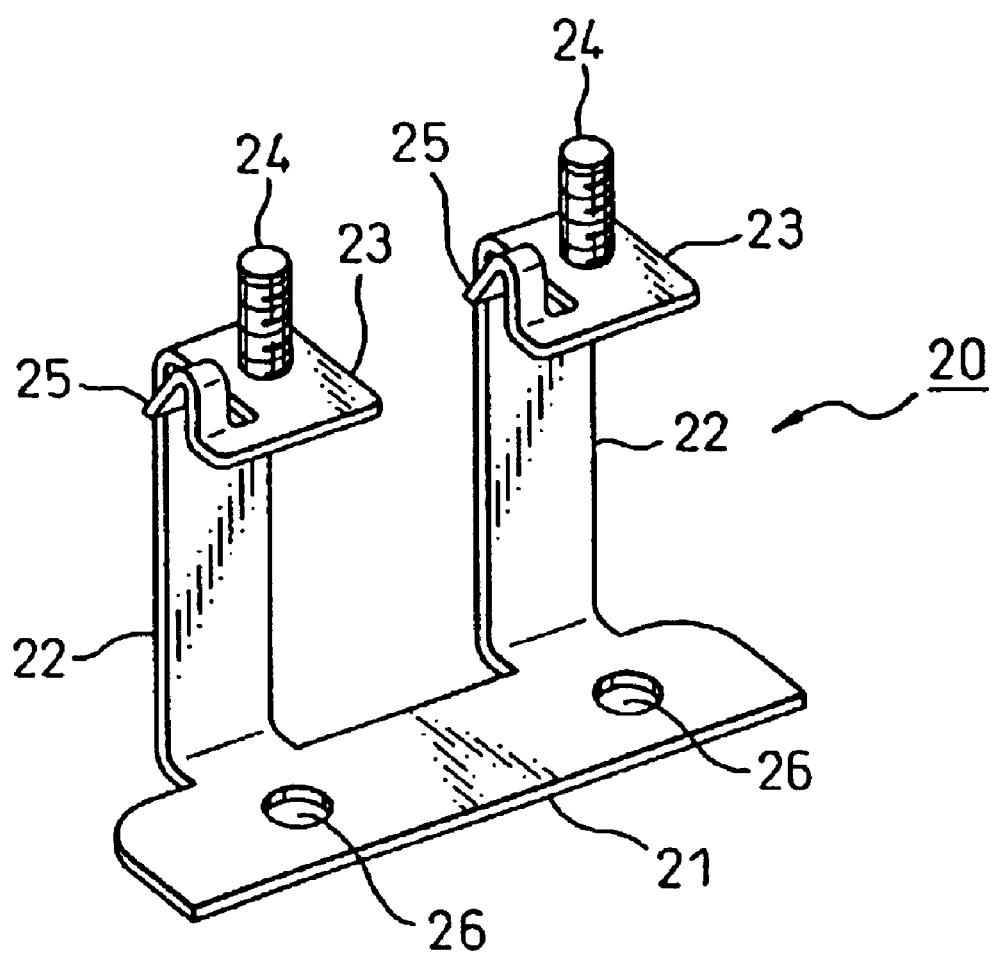

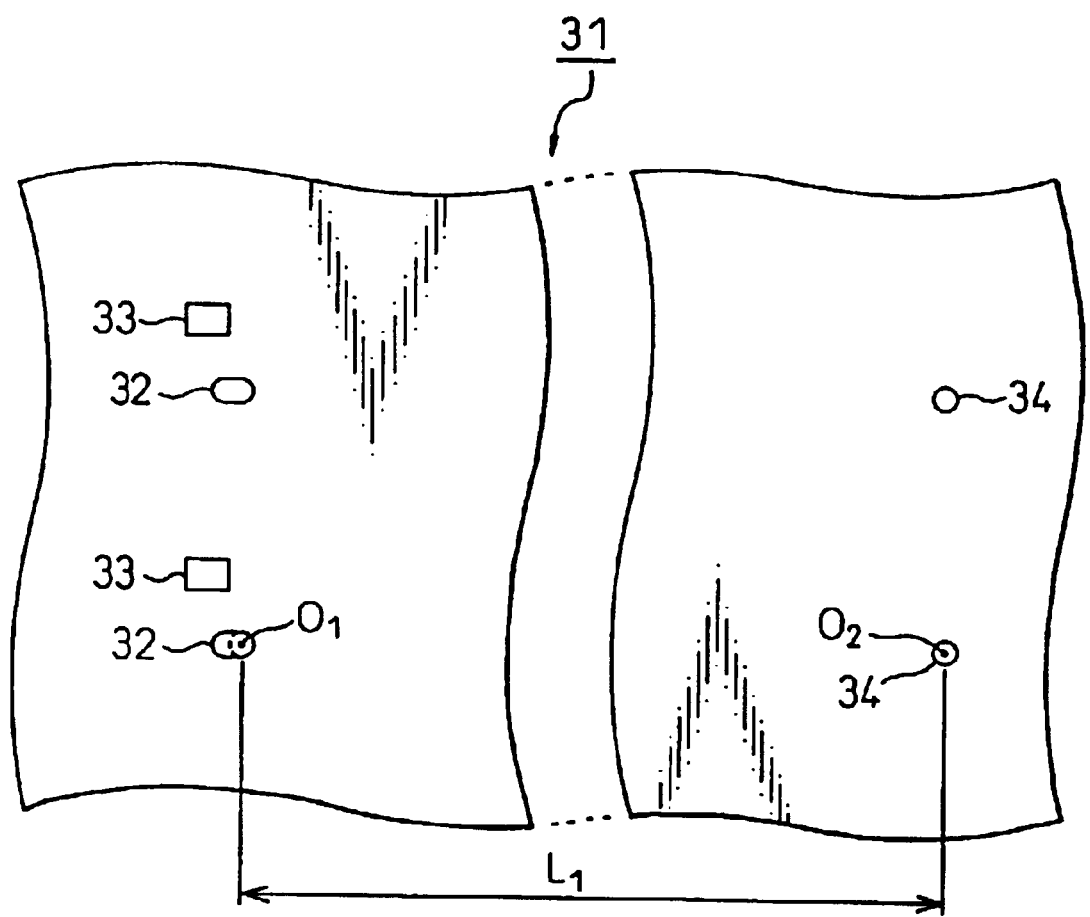

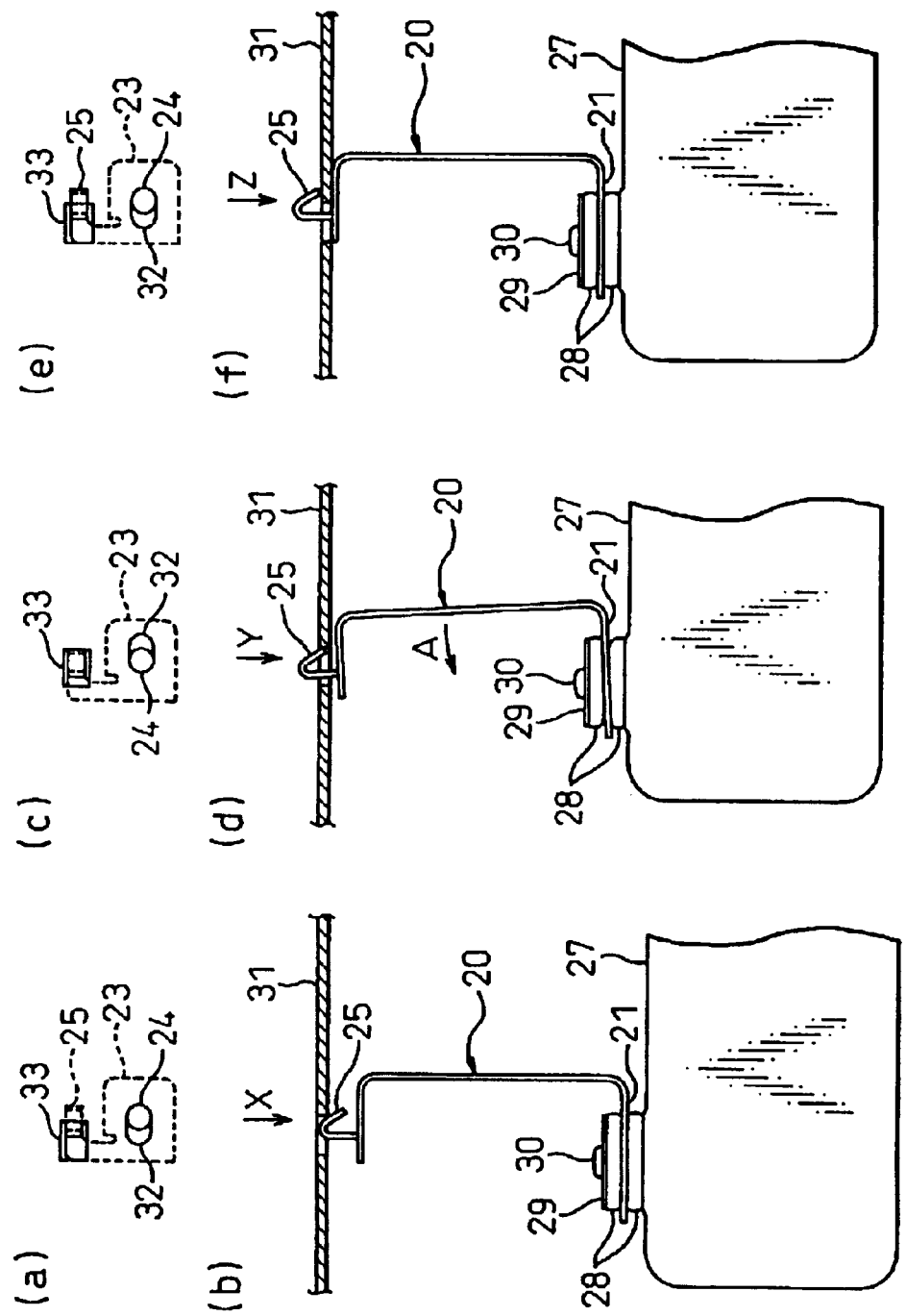

STRUCTURE FOR MOUNTING HEAVY ARTICLE TO CARRIER BODY

BACKGROUND OF THE INVENTION

1. Field of the Invention

The present invention relates to a structure for mounting a heavy article to a carrier body. More specifically, it relates to a structure for mounting a heavy article to a carrier body capable of facilitating the mounting of a heavy article, such as an air cleaner or a rear cooler unit, during the assembly of a vehicle, to a car body which is a carrier body.

2. Description of the Related Art

In the prior art, there is an operation for mounting a device such as an air cleaner or a rear cooler unit to the interior of a car body during the assembly of the vehicle. In the prior art, this mounting operation has been carried out as shown in FIG. 6. As shown in this drawing, brackets 3, each having two stud bolts (planted bolts) 2 disposed at a proper distance between the two, are arranged in advance at two positions on the heavy article 1 such as an air cleaner or a rear cooler unit, which bolts are inserted into attachment holes 5 provided in the car body 4 and fastened by nuts 6 thereto.

In the above-mentioned prior art structure for mounting a heavy article such as an air cleaner or a rear cooler unit to a car body, the mounting operation is difficult. That is, the device such as an air cleaner or a rear cooler unit is as heavy as approximately in a range from 2 to 5 kg, and therefore it is difficult to carry out the operation wherein, after the stud bolts 2 have been inserted into the attachment holes 5, the operator screws the nuts 6 to the stud bolts 2 and fastens the same by one hand while holding the device by the other hand. This is particularly true when the operation is carried out in a narrow space such as a trunk. Also, there may be a risk of dropping the device by mistake.

To avoid such a problem, a resin clamp may be used for temporarily fixing the device. However, there is a problem of increasing the number of parts to increase the cost. Another method for solving the above problem is shown in FIGS. 7A and 7B, wherein hooks 10, 11 are formed at tip ends of a generally U-shaped sheet metal 9 having supporting portions 7, 8 as shown in FIG. 7A and the sheet metal 9 is engaged with an attachment part 12 to support articles 13, 14 to be held by the supporting portions 7, 8. This method is mainly used for fixing an outer tube of control wires by the elastic recovery of sheet metal material. However, the sheet metal material utilizing this elastic recovery is weak, and thus, is improper for supporting the heavy article.

SUMMARY OF THE INVENTION

An object of the present invention is to solve the above-mentioned problems in the prior art by realizing a structure for easily mounting a heavy article, such as an air clearer or a rear cooler unit, used in a vehicle, to a carrier body during the assembly of the heavy article to a car body.

To achieve the above object, the present invention provides a structure for mounting a heavy article 27 to a carrier body 31 via an intermediate member 20, capable of temporarily fixing the heavy article during the mounting operation, wherein the intermediate member 20 is provided in a lower part thereof with a lower attachment portion 21 having holes 26 for fixing the heavy article 27 and in an upper part thereof with upper attachment portions 23 having engagement portions 25 for being temporarily fixed to the carrier body 31 and fixation portions 24 for being firmly fixed to the carrier body 31, and wherein elastic members 28 made of soft material are provided between the lower attachment portions 21 of the intermediate member 20 and the heavy article 27 for allowing a slight vibration of the latter.

That is, the lower attachment portion 21 of the intermediate member 20 is nipped by two of the elastic members 28 made of soft material and the heavy article 27 is fixed by a fastening member 30 via the hole 26, to allow the slight vibration of the heavy article 27.

The fixation portion 24 is, for example, a stud bolt, and the carrier body 31 is provided with oblong holes 32 for receiving the stud bolts and rectangular holes 33 for receiving the engagement portions 25.

In the present invention, the heavy article 27 is preferably an air cleaner or a cooler unit used for a vehicle.

By adopting the above-mentioned structure, according to the present invention, it is possible to realize a structure, for mounting the heavy article such as an air cleaner or a rear cooler unit to the carrier body such as a car body, capable of facilitating the mounting operation during the assembly of a vehicle by allowing the temporary fixation of the heavy article.

The present invention may be more fully understood from the description of preferred embodiments of the invention, as set forth below, together with the accompanying drawings.

BRIEF DESCRIPTION OF THE DRAWINGS

In the drawings;

FIG. 1 is a perspective view for illustrating an intermediate member (bracket) used in a structure for mounting a heavy article to a carrier body according to the present invention;

FIGS. 2A and 2B are illustrations for explaining one embodiment of the structure for mounting the heavy article to the carrier body according to the present invention; wherein FIG. 2A is a plan view illustrating a state in which the intermediate member (bracket) to the heavy article and FIG. 2B is a side view thereof;

FIG. 3 is an illustration for explaining the embodiment of the structure for mounting the heavy article to the carrier body according to the present invention, which is a plan view of the carrier body illustrating the arrangement of holes;

FIG. 4 is an illustration for explaining the steps of mounting the heavy article to the carrier body according to the embodiment of the present invention;

DESCRIPTION OF THE PREFERRED EMBODIMENTS

Figure 2A:
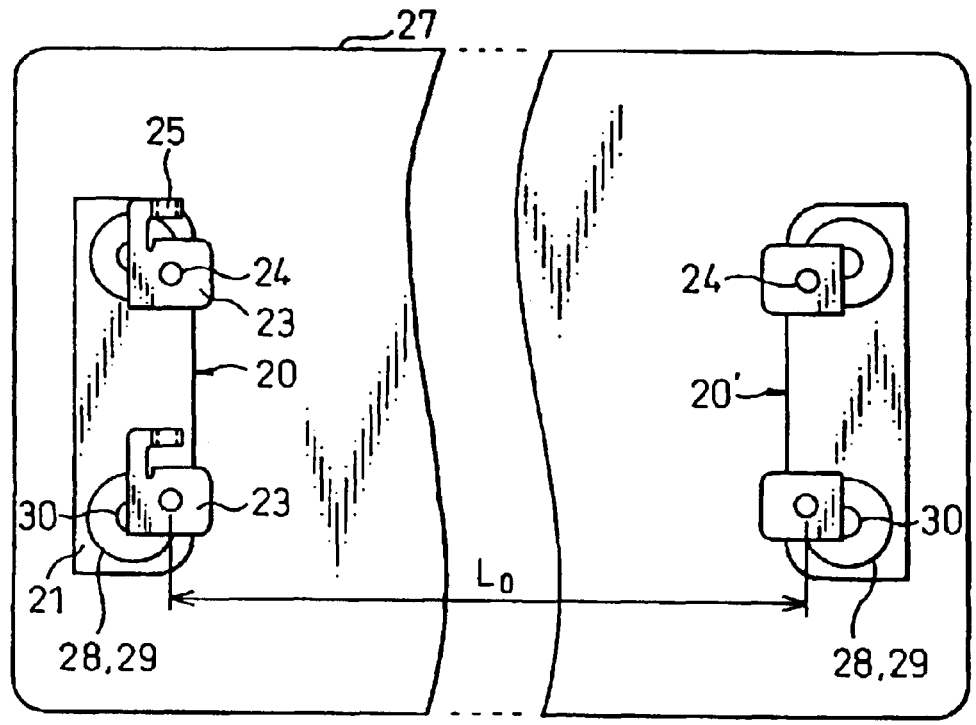

FIG. 1 is a perspective view for illustrating an intermediate member (hereinafter referred to as a bracket) used in a structure for mounting a heavy article to a carrier body according to one embodiment of the present invention. The bracket 20 of this embodiment is integrally made of a sheet metal consisting of a lower attachment portion 21 to be attached to a heavy article 27 such as an air cleaner or a rear cooler unit, a pair of vertical pieces 22 extending from one edge of the lower attachment portion 21, and upper attachment portions 23 formed by bending upper parts of the respective vertical pieces 22 at 90 degrees.

A stud bolt (fixation portion) 24 to be attached to the carrier body is fixed at a center of the upper attachment portion 23, and a hook (engagement portion) 26 to be temporarily fixed to the carrier body is projected upward on a lateral side thereof. In this regard, a tip end of the hook is slanted downward. Also, bolt holes 26 are provided in right and left regions of the lower attachment portion 21, through which the heavy article is to be attached.

Figure 2B:
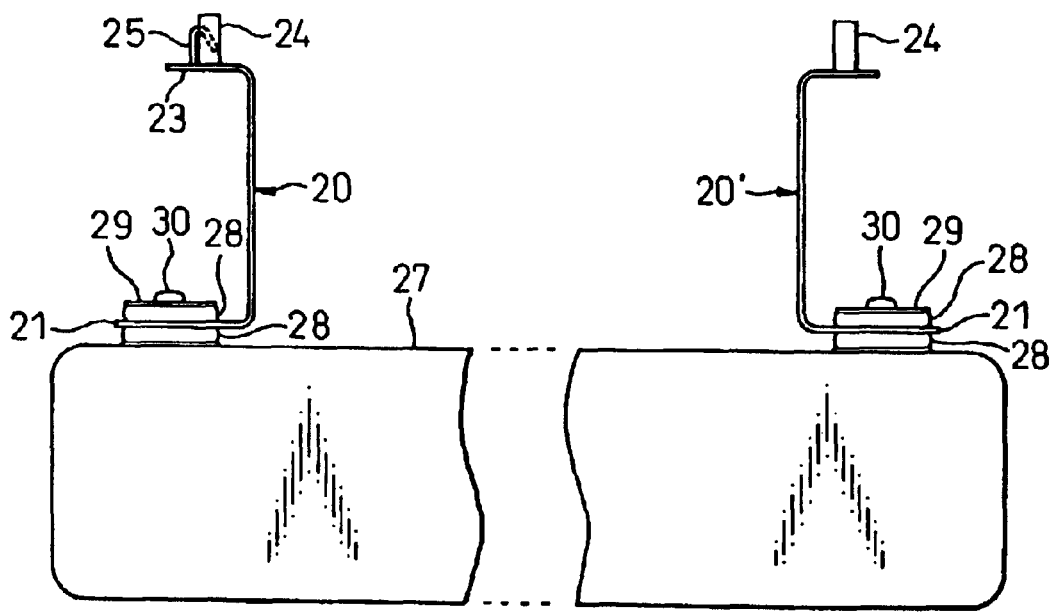

One embodiment of a structure for mounting the heavy article to the carrier body by using the bracket 20 of the above structure will be described with reference to FIGS. 2A to 4. FIGS. 2A and 2B illustrate a state in which the bracket is fixed to the heavy article 27; that is, FIG. 2A is a plan view and FIG. 2B is a side view. In these drawings, reference numeral 27 denotes the heavy article, and 20, 20' denote two brackets attached to right and left sides of the heavy article 27. In this regard, the left bracket 20 is the same as that explained with reference to FIG. 1, and the right bracket 20' eliminates the hook 25 from that shown in FIG. 1.

The mounting of the bracket to the heavy article 27 is such that the periphery of the bolt hole 26 in the lower attachment portion 21 is sandwiched by two disk-like bushes (elastic members) 28 formed of soft material (for example, rubber). Thereafter, a metallic washer 29 and a bolt (fastener member) 30 are applied thereto from above to fasten the bracket to the heavy article 27. The brackets 20, 20' fixed in such a manner are capable of slightly vibrating because the lower attachment portion 21 is sandwiched by the soft bushes 28.

FIG. 3 illustrates the carrier body to which the heavy article is mounted. In this drawing, reference numeral 31 denotes the carrier body (for example, a car body) having a plurality of attachment holes 32, 33 and 34. In four of these holes provided in the left area, two are oblong holes 32 for receiving the stud bolts of the bracket 20 and the other two are rectangular holes 33 for receiving the hooks 25 of the bracket 20. The oblong holes 32 and the rectangular holes 33 are located in correspondence with the stud bolts 24 and the hooks 25 of the bracket 20.

In the right area of the carrier body 31, two circular holes 34 for receiving the stud bolts 24, respectively, are provided at positions in correspondence with the two stud bolts 24 of the bracket 20' to be fixed to the heavy article 27 shown in FIG. 2B. A distance $L_1$ between a rightward center $O_1$ of the left rectangular hole 32 and a center $O_2$ of the right circular hole 34 is equal to a distance $L_0$ between the left and right stud bolts 24, 24 in FIG. 2A.

Next, the steps of mounting the heavy article 27 to the carrier body 31 will be explained with reference to FIG. 4 wherein (a) and (b) illustrate a first step of the mounting operation, (c) and (d) illustrate a second step and (e) and (f) illustrate a third step, and wherein (a) is a view as seen in the direction shown by an arrow X in (b), (c) is a view as seen in the direction shown by an arrow Y in (d) and (e) is a view as seen in the direction shown by an arrow Z in (f).

At the first step for mounting the heavy article 27 to the carrier body 31, the stud bolts 24 in the brackets 20, 20' fixed to the heavy article 27 as shown in FIG. 2B are inserted into the oblong holes 32 and the circular holes 34 in the carrier body 31. Thereby, the left bracket 20 is in a state as shown by (a) and (b) in FIG. 4. That is, the stud bolt 24 in the left bracket 20 is located at the right extremity of the oblong hole 32, while the hook 25 abuts to the right edge of the rectangular hole 33 not to be inserted into the rectangular hole 33. At this first step, it is necessary for the operator to support the heavy article 27 by both hands.

At the second step, an upward force is applied to the left part of the heavy article 27 to push up the same. Then, as shown by (c) and (d) in FIG. 4, a slanted surface of the hook 25 is pushed by the right edge of the rectangular hole 33, and the elastic member (bush) 28 deforms to slightly incline the bracket 20 leftward (in the direction shown by an arrow A), whereby the stud bolt 24 moves to the left extremity of the oblong hole 32. Also at the second step, it is necessary for the operator to support the heavy article 27 by both hand.

At the third step, the upward force is further applied to the heavy article 27 to push up the latter. Then, the hook 25 springs out from the rectangular hole 33 and the bracket 20 which has been inclined by the hook 25 returns to the original state due to the recovery force of the elastic member (bush) 28. Accordingly, a tip end of the hook 25 is engaged with the surface of the carrier body 31 to be in a temporarily fixed state as shown by (e) and (f) in FIG. 4.

At the fourth step not illustrated, a nut is screw-engaged and fastened to the respective stud bolt to complete the mounting operation. Since one side of the heavy article 27 is temporarily fixed to the carrier body 31 by the hook 26, it is possible to lightly support the heavy article 27 by one hand of the operator. Accordingly, the nut-engaging operation can be extremely easily carried out.

Figure 5:
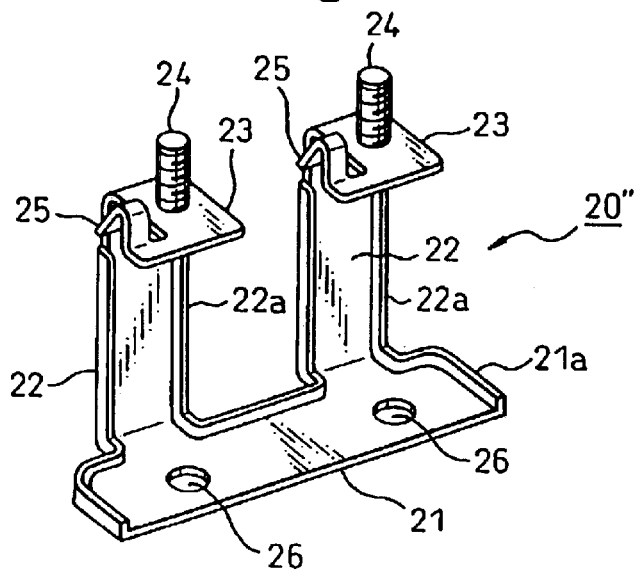
FIG. 5 is a perspective view for illustrating another embodiment of an intermediate member (bracket) used in a structure for mounting the heavy article to the carrier body according to the present invention.
Figure 6:
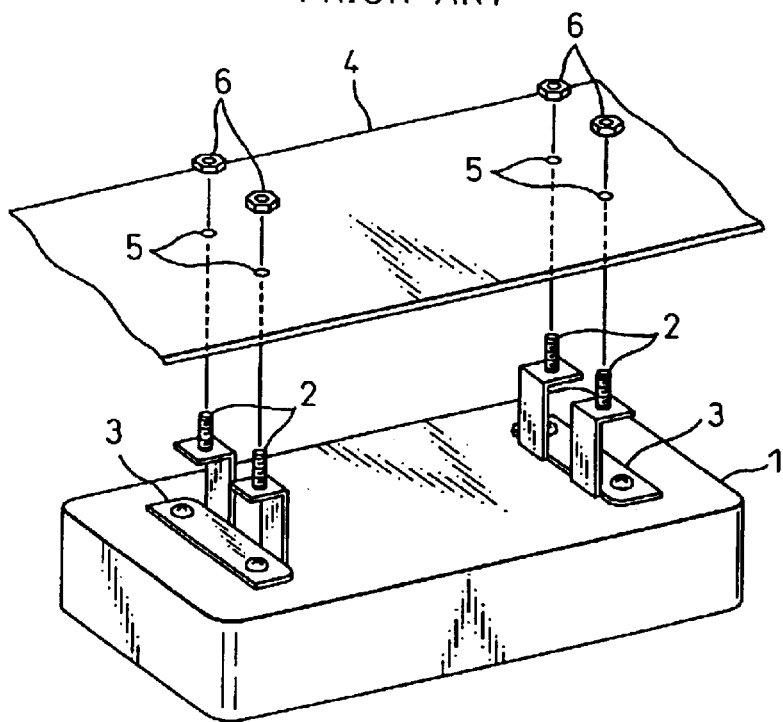
FIG. 6 illustrates a prior art structure for mounting a heavy article to a carrier body.
Figure 7A:
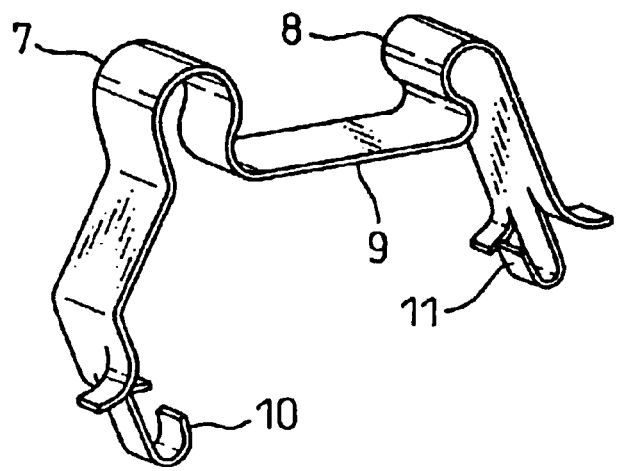
FIGS. 7A and 7B are illustrations of a prior art structure for mounting an article to a carrier body.
Figure 7B:
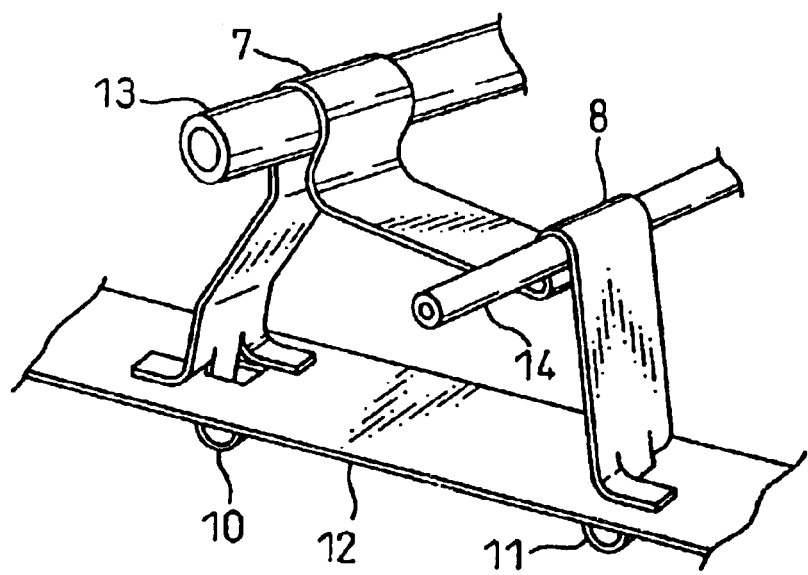

FIG. 5 is a perspective view illustrating another embodiment of an intermediate member (bracket) according to a structure for mounting a heavy article to a carrier body of the present invention. The difference between this bracket 20" and the bracket 20 shown in FIG. 1 is that a flange 21a is provided on the peripheral edge of a lower attachment portion 21 and another flange 22a is provided on opposite lateral edges of the vertical piece 22. Portions other than the above are the same as the preceding embodiment. The bracket 20" thus formed not only exhibits the same effect and operation as those of the bracket 20 shown in FIG. 1 but also is improved in strength.

The structure for mounting the heavy article to the carrier body according to the present invention enables the heavy article to be temporarily held by the hooks provided in the bracket when the heavy article is mounted to the carrier body, so that it is possible to lightly support the heavy article by one hand during the screw-engagement of the nut. This greatly facilitates the mounting operation. Also, as the intermediate member used for the present invention can be formed only by adding hooks to the prior art intermediate member, the manufacturing cost thereof is not largely increased and the strength thereof is guaranteed.

While the invention has been described by reference to specific embodiments chosen for the purpose of illustration, it should be apparent that numerous modifications could be made thereto by those skilled in the art without departing from the basic concept and scope of the invention.

What is claimed is:

1. A structure for mounting a heavy article to a carrier body via a pair of intermediate member, capable of temporarily fixing the heavy article during the mounting operation, said structure comprising:

one intermediate member provided at one side of an upper surface of said heavy article and including an upper attachment portion having a fixation portion, a lower attachment portion and a vertical piece connecting said lower attachment portion to said upper attachment portion, said one intermediate member being made of metal, said upper attachment portion, said lower attachment portion and said vertical piece being integrated, the other intermediate member provide at the other side of the upper surface of said heavy article and including an upper attachment portion having a fixation portion, a lower attachment portion, a vertical piece connecting the lower attachment portion to said upper attachment portion, and a hooked engagement portion provided at said upper attachment portion to temporarily hold said heavy article to said carrier body, said other intermediate member made of metal, said upper attachment portion, said lower attachment portion and said vertical piece being integrated, a tip end of said hooked engagement portion being slanted downward, said carrier body provided with holes for inserting said fixation portion and a hole for inserting said hooked engagement portion, wherein;

elastic members made of soft material are provided between said lower attachment potions of said intermediate members and said heavy article for allowing a slight vibration of said heavy article such that when said fixation portions and of said intermediate members are inserted into said holes for the fixation portion said hooked engagement portion of said other intermediate member is inserted into said hole for the hooked engagement portion, and said tip end of said hooked engagement portion abuts an edge of said hole for the engagement portion.

2. A structure for mounting a heavy article to a carrier body as defined by claim 1, wherein when each of the intermediate member are fixed to the heavy article, the lower attachment portion of the intermediate member is sandwiched between a pair of elastic members made of soft material and fastened to the heavy article via the hole by a fastening member.

3. A structure for mounting a heavy article to a carrier body as defined by claim 1, wherein the fixation portions are stud bolts, and said holes for inserting said fixation portions are oblong holes for receiving the stud bolts and said hole for inserting said hooked engagement portion is a rectangular hole for receiving the hooked engagement portion.

4. A structure for mounting a heavy article to a carrier body as defined by claim 1, wherein the heavy article is a cooler unit used in a vehicle.

5. A structure for mounting a heavy article to a carrier body as defined in claim 4, wherein the cooler unit is a rear cooler unit.

6. A structure for mounting a heavy article to a carrier body as defined by claim 1, wherein the heavy article is an air cleaner for use in a vehicle.

* * * * *